(12) United States Patent
Kobayashi (10) Patent No.: US 6,721,564 B1
(45) Date of Patent: Apr. 13, 2004

(54) MOBILE COMMUNICATION TERMINAL APPARATUS HAVING HAND-OVER REQUESTING FUNCTION, HAND-OVER CONTROL DEVICE, HAND-OVER CONTROLLING METHOD AND STORAGE MEDIUM STORING THE HAND-OVER CONTROLLING METHOD (75) Inventor: Shigeyuki Kobayashi, Sagamihara (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/544,291

(22) Filed: Apr. 6, 2000

(30) Foreign Application Priority Data

| Apr. 7, 1999 | (JP) | ............................................. 11-100231 |
| Mar. 14, 2000 | (JP) | ....................................... 2000-069689 |

(51) Int. Cl.⁷ ................................................ H04Q 7/20
(52) U.S. Cl. ........................ 455/436; 455/437; 455/442; 455/439; 455/513; 455/450; 370/330; 370/331; 370/333
(58) Field of Search ................................. 455/436, 442, 455/437, 439, 513, 450; 370/320, 331, 333, 335, 342, 441

(56) References Cited

U.S. PATENT DOCUMENTS

| 5,577,022 A |  | 11/1996 | Padovani et al. |  |
| 5,812,540 A | * | 9/1998 | Bruckert et al. | ............ 370/332 |
| 5,920,550 A |  | 7/1999 | Willey |  |
| 6,044,272 A | * | 3/2000 | Kobylinski et al. | ......... 370/331 |
| 6,055,427 A | * | 4/2000 | Ojaniemi | ..................... 370/331 |
| 6,078,570 A | * | 6/2000 | Czaja et al. | ................. 370/331 |
| 6,256,501 B1 | * | 7/2001 | Tokuyama et al. | .......... 455/437 |
| 6,337,984 B1 | * | 1/2002 | Hong et al. | ................. 370/332 |

FOREIGN PATENT DOCUMENTS

| GB | 0917308 A1 | * | 5/1999 |
| GB | 1198149 A1 | * | 4/2002 |
| JP | 10-136428 |  | 5/1998 |
| JP | 10-509293 |  | 9/1998 |
| WO | WO 98/32262 | * | 7/1998 |

* cited by examiner

Primary Examiner—Vivian Chin
Assistant Examiner—Sujatha Sharma
(74) Attorney, Agent, or Firm—Finnegan, Henderson, Farabow, Garrett & Dunner, L.L.P.

(57) ABSTRACT

When it is determined that the hand-over is necessary, a pilot strength measurement message is generated and transmitted to a base station BSa, under the hand-over request control. Arrival of an acknowledgement response from the base station BSa is monitored. If the acknowledgement response is not sent back before a timer times out, the receiving strength of a pilot channel PNa2 in the established synchronization and the receiving strengths of pilot channels PNb1 to PNb3 and PNc1 to PNc3 from neighboring base stations BSb, BSc and remaining base stations are re-measured, and the pilot strength measurement message including the latest measurement values obtained from the re-measurement is retransmitted to the base station BSa.

15 Claims, 5 Drawing Sheets

MOBILE COMMUNICATION TERMINAL APPARATUS HAVING HAND-OVER REQUESTING FUNCTION, HAND-OVER CONTROL DEVICE, HAND-OVER CONTROLLING METHOD AND STORAGE MEDIUM STORING THE HAND-OVER CONTROLLING METHOD

CROSS-REFERENCE TO RELATED APPLICATIONS

This application is based upon and claims the benefit of priority from the prior Japanese Patent Applications No. 11-100231, filed Apr. 7, 1999; and No. 2000-069689, filed Mar. 14, 2000, the entire contents of which are incorporated herein by reference.

BACKGROUND OF THE INVENTION

The present invention relates to a mobile communication terminal apparatus, a hand-over control device, a hand-over controlling method and a storage medium storing the hand-over controlling method, which are used in a cellular mobile communication system, and more particularly to a mobile communication terminal apparatus having a function of detecting the quality degradation of a radio channel and requesting a base station to operate the hand-over, a hand-over control device, a hand-over controlling method and a storage medium storing the hand-over controlling method.

Recently, a cellular mobile communication system whose typical is a portable telephone system, has been rapidly spread. The cellular mobile communication system distributes a plurality of base stations in a service area and forms a radio zone called a cell by these base stations. Then, the system connects a mobile communication terminal apparatus to the base stations of the radio zone where the terminal apparatus exists via a radio channel and further connects this base station to a terminal apparatus of a communication partner via a public network or the like, and thereby implements the communication between the terminals.

Incidentally, when the mobile terminal apparatus moves from a radio zone where it currently exists to another radio zone during the standby time or communication time, changing the base station in the established synchronization to the base station of the moving destination or what is called hand-over occurs in this type of the system. The hand-over operations will be explained below by exemplifying a system adopting the CDMA (Code Division Multiple Access) system.

That is, the CDMA mobile communication terminal apparatus measures the receipt level of a pilot signal transmitted by the base station in the established synchronization and also measures each of receipt levels of pilot signals transmitted by respective neighboring base stations, during the standby time or communication time. As for the strength of the receipt level, a ratio (Ec/Io) of the energy (Ec) of the despread pilot signal from the base station which is to be measured to the total receipt energies (Io) of the despread pilot signals may be used. When the receipt level from a neighboring base station is equal to or higher than a predetermined level in terms of the strength, or when the ratio of the receipt level from the base station which is in the established synchronization to the receipt level from the neighboring base station exceeds a predetermined value, the apparatus generates a message for requesting the hand-over and transmits it to the base station in the established synchronization. At this time, the measurement value of the receipt level from the base station in the established synchronization and the measurement values of the receipt levels from the neighboring base stations, are inserted into the message for requesting the hand-over.

When the base station receives the message for requesting the hand-over from the mobile communication terminal apparatus, a base station at the hand-over destination is determined on the basis of the measurement values of the receipt levels from the base stations that are inserted into the message, and this determined hand-over destination is noticed to the mobile communication terminal apparatus that has requested the hand-over. When the mobile communication terminal apparatus receives this notice, the apparatus makes a response to the base station and then changes the base station in the established synchronization on the basis of the notice. Thus, the hand-over of the mobile communication terminal apparatus is executed.

However, this kind of the conventional system has the following problem that should be solved. When the mobile communication terminal apparatus transmits the message for requesting the hand-over, the apparatus waits for a response message representing the acknowledgement that is to be sent back from the base station. If the response message representing the acknowledgement has not been sent back within a certain time, the apparatus assumes that the quality of the radio channel is temporarily degraded, and then repeats the transmission of the message for requesting the hand-over in a predetermined access sequence at the times designated by the base station.

However, if the measurement value of the receipt level is not noticed to the base station by the repeated transmissions, the noticed measurement value of the receipt level is often different from an actual measurement value at the current time. Particularly, if the mobile communication terminal apparatus moves at a high speed, the difference between the noticed measurement value and the actual value becomes larger since a point where he receipt levels from the respective base stations are measured largely changes to the position of the mobile communication terminal apparatus at the time when the hand-over requesting message actually reaches the base station. In such a case, the base station determines the hand-over destination on the basis of the previous measurement value that is different from the actual one and, therefore, the hand-over may not be properly executed.

BRIEF SUMMARY OF THE INVENTION

The present invention is accomplished in consideration of the above circumstances, and its object is to provide a mobile communication terminal apparatus capable of allowing the hand-over to be executed to an optimum base station at any time even when the request for the hand-over is noticed by the repeated transmissions of the message, and thereby keeping the stable communication.

In according to one aspect of the present invention, there is provided a mobile communication terminal apparatus having a function of detecting degradation of receiving quality thereof and transmitting a request for hand-over to a base station in a state of being in the established synchronization with any one of a plurality of base stations. The mobile communication terminal apparatus is characterized by comprising: hand-over determination means for measuring receiving qualities of radio signals transmitted by the base station in the established synchronization and neighboring base stations and determining necessity of the hand-over on the basis of a result of the measurement; message transmission means for generating a request message including the measured qualities and transmitting the generated request message to the synchronized base station when it is determined by the hand-over determination means that the hand-over is necessary; message retransmission means for monitoring an acknowledgement response from the synchronized base station in response to the transmitted request message and repeating the transmission of the request message when there is no response from the synchronized base station within a predetermined time; and receiving quality update means for renewing the measured qualities included in the message to latest values before the message retransmission means retransmits the request message.

Therefore, according to this invention, when the request message is retransmitted, the receiving quality measurement values inserted into the message are always updated to the latest values. For this reason, the destination of the hand-over can be always determined on the basis of the latest measurement values and thereby the optimum hand-over can be always executed, at the base station.

In according to the other aspect of the present invention, there is provided a mobile communication terminal apparatus having a function of detecting degradation of receiving quality thereof and transmitting a request for hand-over to a base station in a state of being in the established synchronization with any one of a plurality of base stations. The mobile communication terminal apparatus is characterized by comprising: hand-over determination means for measuring receiving qualities of radio signals transmitted by the base station in the established synchronization and neighboring base stations and determining necessity of the hand-over on the basis of a result of the measurement; message transmission means for generating a request message including the measured qualities and transmitting the generated request message to the synchronized base station when it is determined by the hand-over determination means that the hand-over is necessary; message retransmission means for monitoring an response of acknowledgement from the base station to the transmission of the request message, and repeating the transmission of the request message when there is no response from the synchronized base station within a predetermined time; and receiving quality update means for re-measuring the receiving qualities of the radio signals transmitted by the base station in the established synchronization and the neighboring base stations, after it is detected that there is no response of acknowledgement from the base station, and renewing the measured qualities included in the message to latest values on a basis of a result of the re-measurement.

With this structure, in the request message that is to be retransmitted, the receiving quality measurement values measured after the necessity of the retransmission is determined are inserted. For this reason, the latest receiving quality measurement values can be always noticed to the base station.

In according to the other aspect of the present invention, there is provided a mobile communication terminal apparatus having a function of detecting degradation of receiving quality thereof and transmitting a request for hand-over to a base station in a state of being in the established synchronization with any one of a plurality of base stations. The mobile communication terminal apparatus is characterized by comprising: hand-over determination means for measuring receiving qualities of radio signals transmitted by the base station in the established synchronization and neighboring base stations and determining necessity of the hand-over on the basis of a result of the measurement; message transmission means for generating a request message including the measured qualities and transmitting the generated request message to the base station in the established synchronization when it is determined by the hand-over determination means that the hand-over is necessary; message retransmission means for monitoring an acknowledgement response from the synchronized base station in response to the transmitted request message, and repeating the transmission of the request message when there is no response from the synchronized base station within a predetermined time; and receiving quality update means for re-measuring the receiving qualities of the radio signals transmitted by the base station in the established synchronization and the neighboring base stations, simultaneously with an operation of monitoring the acknowledgement response from the base station, and renewing the measured qualities included in the message to latest values on a basis of a result of the re-measurement.

With this structure, the re-measurement of the receiving quality is executed, simultaneously with the operation of monitoring the acknowledgement response from the base station. For this reason, when the retransmission of the request message is required, the receiving quality measurement values having been obtained at this time can be inserted into the request message and this message can be immediately retransmitted. Therefore, the time required for the retransmission of the request message can be reduced and thereby the hand-over can be smoothly executed.

In according to the other aspect of the present invention, there is provided a CDMA mobile communication terminal apparatus having a function of receiving signals transmitted by a base station in the established synchronization and neighboring base stations, demodulating the received signals, detecting degradation of receiving qualities of the demodulated signals and transmitting a request for hand-over to the base stations in a state of being in the established synchronization with any one of a plurality of base stations. This CDMA mobile communication terminal apparatus is characterized by comprising: hand-over determination means for measuring receiving qualities of the demodulated radio signals and determining necessity of the hand-over on the basis of a result of the measurement; message transmission means for generating a request message including the measured qualities and transmitting the generated request message to the synchronized base station when it is determined by the hand-over determination means that the hand-over is necessary; message retransmission means for monitoring an acknowledgement response from the synchronized base station in response to the transmitted request message, and repeating the transmission of the request message when there is no response from the synchronized base station within a predetermined time; and receiving quality update means for renewing the measured qualities included in the message to latest values before the message retransmission means retransmits the request message.

In according to the other aspect of the present invention, there is provided a control device used in a mobile communication terminal apparatus having a function of detecting degradation of receiving quality thereof and transmitting a request for hand-over to abase station in a state of being in the established synchronization with any one of a plurality of base stations. The control device is characterized by comprising: hand-over determination means for measuring receiving qualities of radio signals transmitted by the base station in the established synchronization and neighboring base stations and determining necessity of the hand-over on the basis of a result of the measurement; instruction means for generating a request message including the measured qualities and instructing to transmit the generated request message to the synchronized base station when it is determined by the hand-over determination means that the hand-over is necessary; re-instruction means for monitoring an acknowledgement response from the synchronized base station in response to the transmitted request message and instructing to repeat the transmission of the request message when there is no response from the synchronized base station within a predetermined time; and quality update means for renewing the measured qualities included in the message to latest values when the re-instruction means makes an instruction to retransmit the request message.

Therefore, this invention can provide a control device that can allow the receiving quality measurement values inserted into the message to be always updated to the latest values when the request message is retransmitted. The control device can be implemented by an integrated circuit such as a gate array and the like or a microprocessor comprising a memory.

In according to the other aspect of the present invention, there is provided a hand-over controlling method used in a control device used in a mobile communication terminal apparatus having a function of detecting degradation of receiving quality thereof and transmitting a request for hand-over to abase station in a state of being in the established synchronization with any one of a plurality of base stations. The hand-over controlling method is characterized by comprising the steps of: measuring receiving qualities of radio signals transmitted by the base station in the established synchronization and neighboring base stations and determining necessity of the hand-over on the basis of a result of the measurement; generating a request message including the measured qualities and instructing to transmit the generated request message to the synchronized base station when it is determined at the hand-over determination step that the hand-over is necessary; monitoring an acknowledgement response from the synchronized base station in response to the transmitted request message and instructing to repeat the transmission of the request message when there is no response from the synchronized base station within a predetermined time; and renewing the measured qualities included in the message to latest values when the repeating instruction step makes an instruction to retransmit the request message.

Therefore, this invention can provide a hand-over controlling method that can allow the receiving quality measurement values inserted into the message to be always updated to the latest values when the request message is retransmitted.

In according to the other aspect of the present invention, there is provided a storage medium for storing a program to allow a processor to execute a hand-over controlling method used in a mobile communication terminal apparatus (MS) having a function of detecting degradation of receiving quality thereof and transmitting a request for hand-over to abase station in a state of being in the established synchronization with any one of a plurality of base stations. The hand-over controlling method stored in the storage medium is characterized by comprising the steps of: measuring receiving qualities of radio signals transmitted by the base station in the established synchronization and neighboring base stations and determining necessity of the hand-over on the basis of a result of the measurement; generating a request message including the measured qualities and instructing to transmit the generated request message to the synchronized base station when it is determined at the hand-over determination step that the hand-over is necessary; monitoring an acknowledgement response from the synchronized base station in response to the transmitted request message and instructing to repeat the transmission of the request message when there is no response from the synchronized base station within a predetermined time; and renewing the measured qualities included in the message to latest values when the repeating instruction step makes an instruction to retransmit the request message.

Therefore, this invention can provide a storage medium for storing a program to allow a processor to execute the hand-over controlling method that can allow the receiving quality measurement values inserted into the message to be always updated to the latest values when the request message is retransmitted. As for this storage medium, a memory such as a ROM including the EEPROM or a RAM and the like, a floppy disk, a hard disk, an optical disk such as a CD-ROM disk and a DVD disk, a memory card, and the other storage medium that can store the program can be used.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
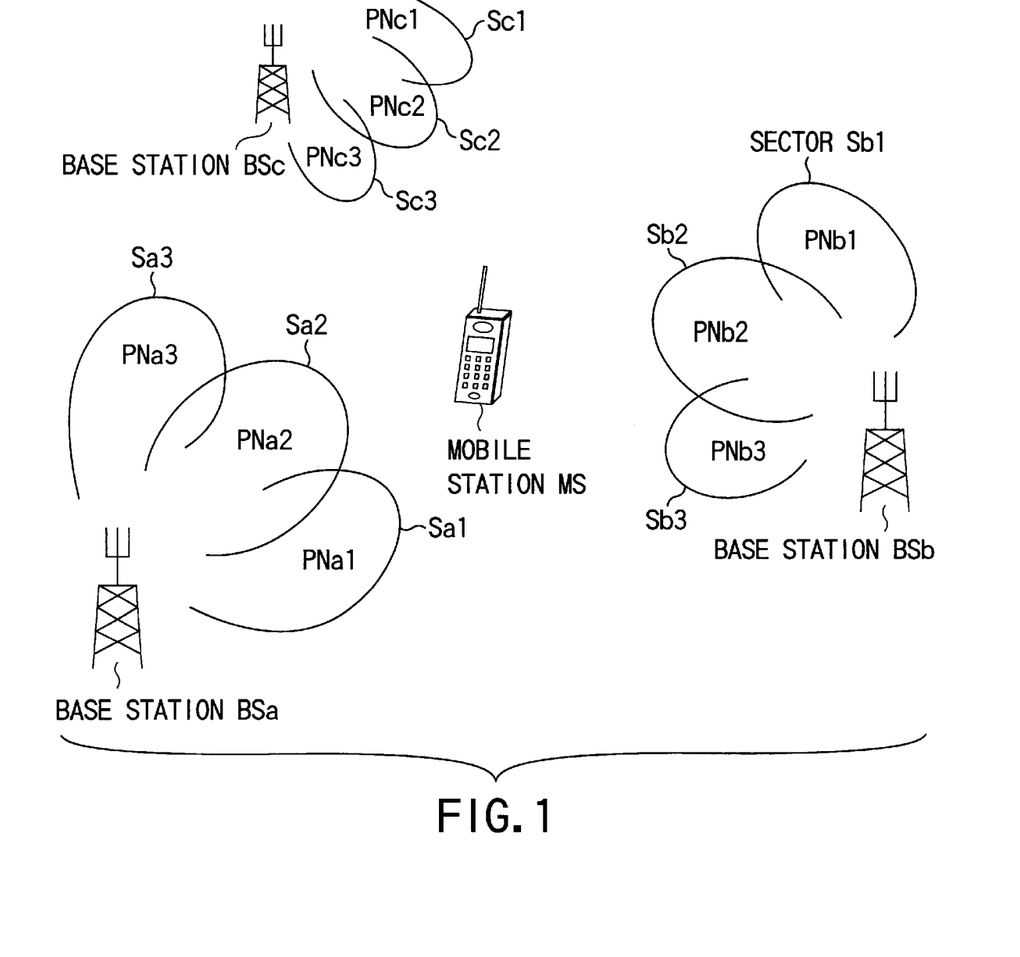
FIG. 1 is a schematic diagram showing a CDMA mobile communication system that is an embodiment of a cellular mobile communication system according to the present invention.

FIG. 1 is a schematic diagram showing a CDMA mobile communication system that is an embodiment of a cellular mobile communication system according to the present invention.

A plurality of base stations BSa, BSb, BSc, . . . (only three stations in the figure) is distributed in a service area of the system. Each of these base stations BSa, BSb, BSc, . . . broadcasts pilot channels PNa1 to PNa3, PNb1 to PNb3 and PNc1 to PNc3 using spreading codes different in offset values in respective sectors Sa1 to Sa3, Sb1 to Sb3 and Sc1 to Sc3. As for the spreading codes, for example, PN (Pseudo Noise) codes, and orthogonal codes employing the Walsh sequence, Orthogonal Gold sequence and the like are used together. The reason why the orthogonal codes are used is to improve the or thogonality between the channels and thereby further restrict the interference.

A mobile communication terminal apparatus MS establishes the synchronization with any of the pilot channels PNa1 to PNa3, PNb1 to PNb3 and PNc1 to PNc3 that the base stations BSa, BSb, BSc, . . . broadcast, and makes the communication. At this time, to make the communication with good quality, the synchronization with the pilot channel of preferable receiving quality always needs to be established, and for this reason, the hand-over process is executed at the mobile communication terminal apparatus MS in the standby state.

In hand-over process, the mobile communication terminal apparatus MS constantly compares the receiving quality of the pilot channel in the established synchronization with the receiving quality of the other pilot channels that are synchronization establishment candidates while executing the intermittent receipt operations in the standby state. If the mobile communication terminal apparatus MS finds the pilot channel, of the other pilot channels that are the synchronization establishment candidates, whose receiving quality is preferably equal to or higher than the receiving quality of the pilot channel in the established synchronization by a predetermined level, the target of the synchronization establishment is changed to this pilot channel.

Figure 2:
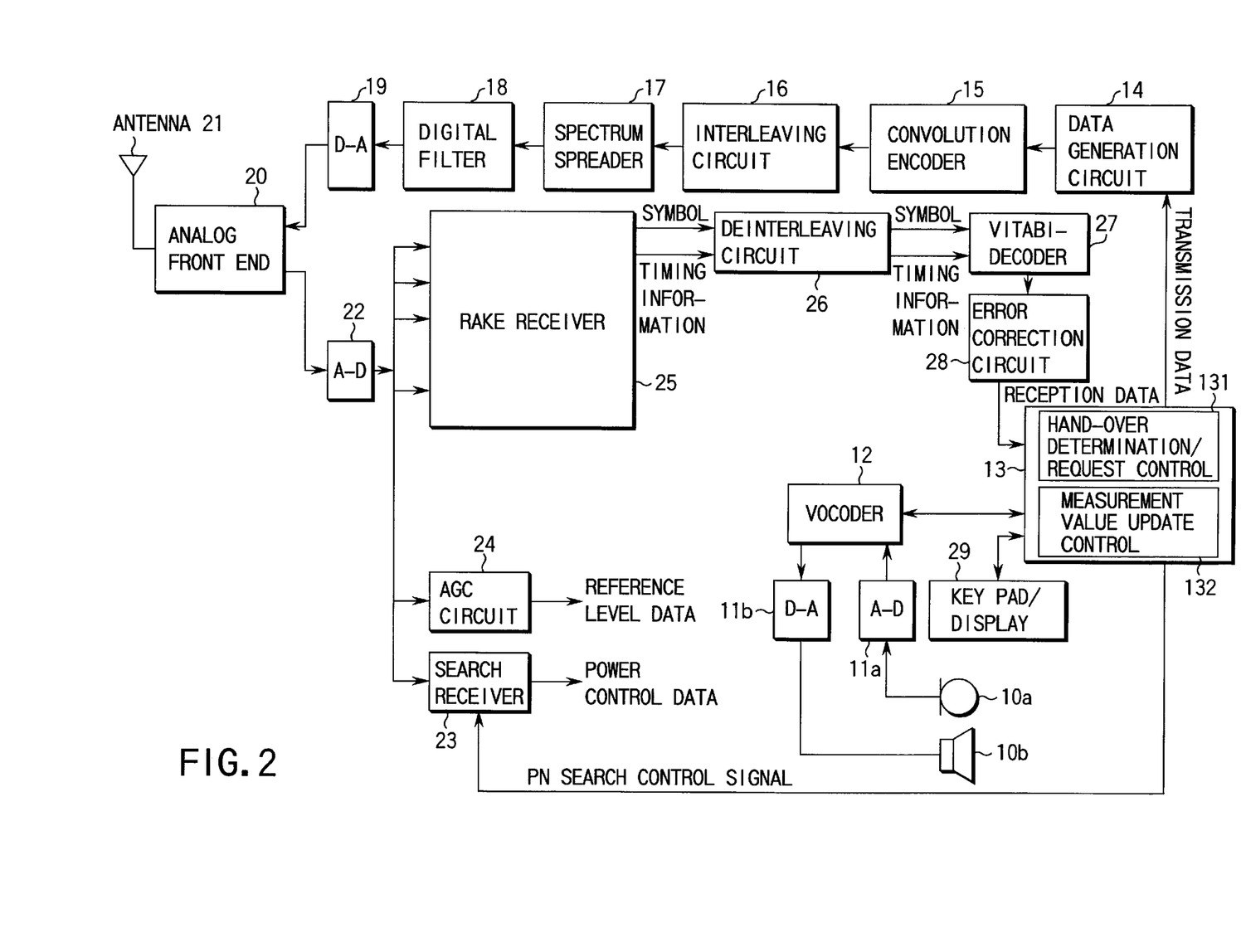
FIG. 2 is a circuit block diagram showing a CDMA mobile communication terminal apparatus used in the system shown in FIG. 1.

FIG. 2 is a circuit block diagram showing a structure of the mobile communication terminal apparatus MS according to the present embodiment.

In this figure, a speaker's transmission voice signal that is output from a microphone 10a is converted into a digital signal by an analog-digital converter (A-D) 11a and then input to a voice coder-decoder (hereinafter called a vocoder) 12. The vocoder 12 employs the variable rate voice coding scheme, which selects one of four coding rates 9600 bps, 4800 bps, 2400 bps and 1200 bps and then allows the input digital voice signal to be coded at the selected coding rate. The coding rate is instructed in accordance with a rate control signal from a micro-processor (MPU) 13.

In the micro-processor (MPU) 13, a control signal or the like is added to the coded digital voice signal that is output from the vocoder 12 and thereby transmission data is generated. An error detection code and an error correction code are added to the transmission data at a data generation circuit 14. Then the transmission data is coded by a convolution encoder 15 and is further subjected to the process for interleaving by an interleaving circuit 16. The transmission data that is output from the interleaving circuit 16 is spectrum-spread to a wide-band signal in accordance with a spreading code by a spectrum spreader 17.

After unnecessary frequency components are removed from the spread-spectrum transmission signal by a digital filter 18, the transmission signal is converted into an analog signal by a digital-analog converter (D-A) 19. This analog transmission signal is up-converted to a predetermined radio frequency and power-amplified to a predetermined transmission power level by an analog front end 20, and is transmitted from an antenna 21 to, for example, the base stations.

On the other hand, the spread-spectrum radio signal received by the antenna 21 is amplified by a low-noise amplifier in the analog front end 20 and is down-converted into an intermediate frequency or a base-band frequency. The receiving signal that is output from the analog front end 20 is converted into a digital signal in a predetermined sampling cycle by an analog-digital converter (D-A) 22, and the digital signal is input to a search receiver 23, an automatic gain control (AGC) circuit 24 and a RAKE receiver 25.

The RAKE receiver 25 comprises, for example, four finger circuits and a symbol combiner for symbol-combining output signals from the finger circuits. The respective finger circuits independently spectrum-despread receiving signals of a desired paths at a high receipt level, and thereby separate the receiving signals of four different paths from multi-path radio signals and reproduce them.

The search receiver 23 searches for the PN code of the pilot channel that is broadcast by the base station and acquires the offset of the code. The search receiver 23 basically has the same structure as that of the finger circuit. The power control data that is obtained by the searching operation of this PN code is input to the micro-processor 13.

A demodulated symbol that is output from the RAKE receiver 25 is input to a deinterleaving circuit 26 together with the timing information and is subjected to the deinterleaving process in the deinterleaving circuit 26. After that, the demodulated symbol after deinterleaving is Vitabi-decoded by a Vitabi-decoder 27. The demodulated symbol after Vitabi-decoded is subjected to the error correction decoding process by an error correction circuit 28 so as to be received data, which is input to the microprocessor 13. In the microprocessor 13, the received data is divided into the voice data and the control data. The voice data is voice-decoded by the vocoder 12 and converted by a digital-analog converter (D-A) 11b, into an analog signal, which is output from a loudspeaker 10b.

A key pad/display 29 is provided to allow the user to input and set the dial data, control data and the like and to display various kinds of the information associated with the operating states of the mobile communication terminal apparatus MS. The operations of the key pad/display 29 are controlled by the microprocessor 13.

Incidentally, the micro-processor 13 comprises hand-over determination/request control means 131 and measurement value update control means 132 as the control functions associated to the present invention, in addition to general control functions such as the communication link control, communication control and the like executed with outgoing calls and incoming calls. A memory (not shown) is provided in the microprocessor 13. The microprocessor 13 executes programs stored in the memory and thus the control functions are accomplished. The programs may be copied from a storage medium storing the hand-over control program, to this memory. As for the storage medium, a memory such as a ROM including the EEPROM, RAM and the like, a floppy disk, a hard disk, an optical disk such as a CD-ROM disk and a DVD disk, a memory card, and the other storage medium capable of storing the programs can be used.

The hand-over determination/request control means 131 measures the receiving strengths of the pilot channels that are broadcast by the base stations in the established synchronization and the neighboring base stations that are to be synchronization establishment candidates, and determines whether the hand-over is necessary or not in accordance with the measurement values. If the means 131 determines the necessity of the hand-over, the means (3) generates a request message including the receiving strength measurement values of the respective pilot channels and transmits the generated request message to the base stations in the established synchronization. After transmitting the request message, the means 131 monitors whether the acknowledgement response is sent back from the base station within a certain time. If the response is not sent back, the means 131 transmits again the request message. After that, the means 131 repeats the retransmission of the request message at the times that the base station preliminarily designates, until the acknowledgement response is sent back from the base station.

The measurement value update control means 132 measures again the receiving strengths of the pilot channels every time the request message is retransmitted, and updates the measured strengths inserted into the retransmitted request message to latest receiving strength measurement values obtained by the measurement.

Next, the operations of the above-constituted mobile communication terminal apparatus MS will be explained.

It is now assumed that, for example, the mobile communication terminal apparatus MS that has established the synchronization with the pilot channel PNa2 transmitting from the base station BSa moves toward the base station BSb.

Figure 3:
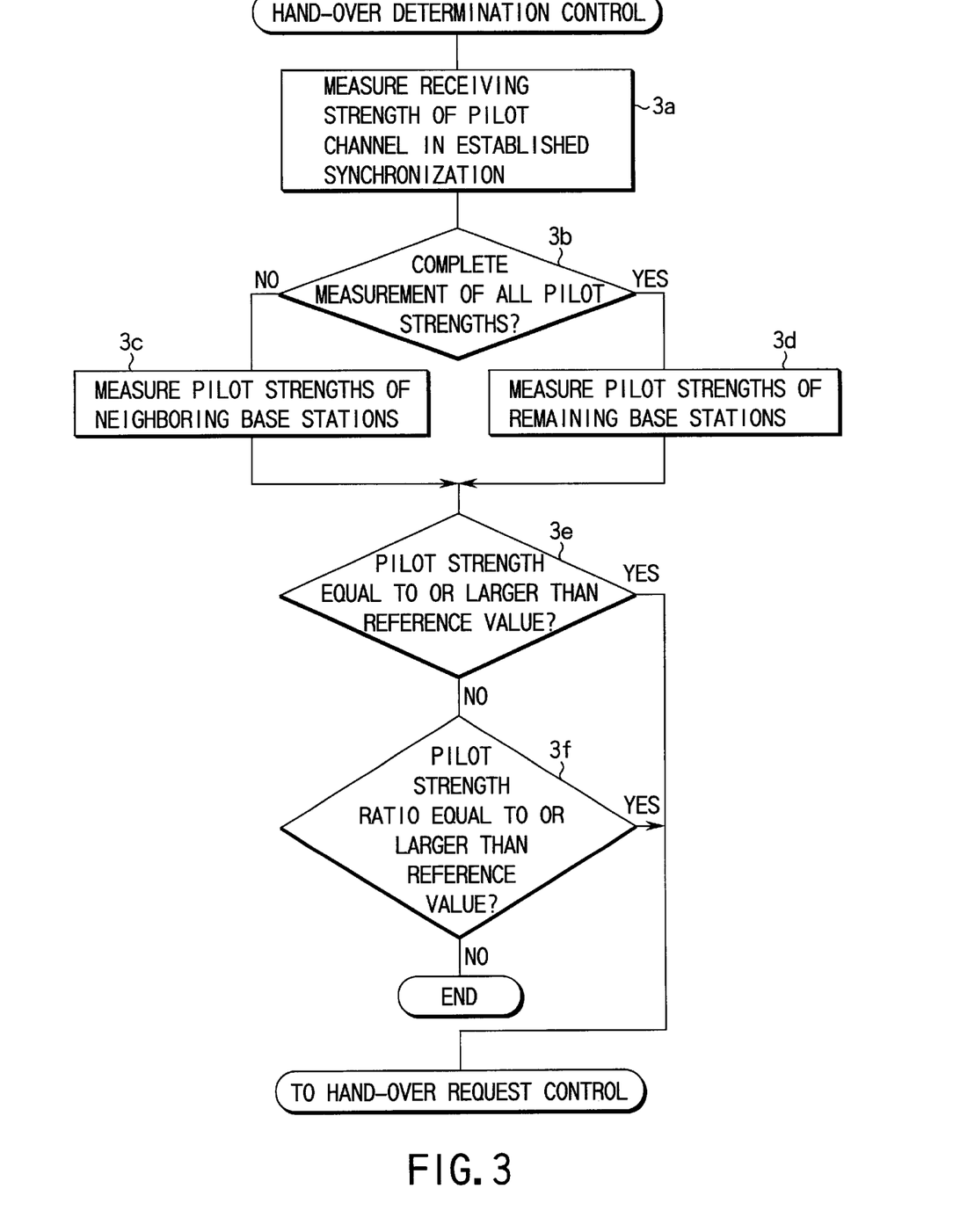
FIG. 3 is a flow chart showing hand-over determination control steps that are executed at a mobile communication terminal apparatus shown in FIG. 2 and their contents.

At this time, the necessity of the hand-over is determined in the following manner, in the mobile communication terminal apparatus MS. FIG. 3 is a flow chart showing the control steps and their control contents. The mobile communication terminal apparatus MS first measures the receiving strength $(Ec/Io)_{PNa2}$ of the pilot channel PNa2 in the established synchronization, at step 3a. The apparatus MS also determined at step 3b whether the measurement of the receiving strengths of the pilot channels of the neighboring base stations BSb and BSc has been completed or not. If the measurement has not yet been completed, the operation proceeds to step 3c and the apparatus MS sequentially receives the respective pilot channels of neighboring base stations BSb and BSc and measures their receiving strengths, in accordance with a neighbor list message informed from the base station BSa through the pilot channel PNa2 in the established synchronization. The neighbor list message includes the PN codes of the base stations neighboring the base station in the established synchronization, and the mobile communication terminal apparatus MS measures at least the receiving strengths of the pilot signals from the neighboring base stations identified in accordance with these PN codes. On the other hand, if the measurement of the receiving strengths of the respective pilot channels of the neighboring base stations BSb and BSc has been completed, the apparatus MS measures the receiving strengths of the pilot channels from remaining base stations at step 3d. The remaining base stations are base stations other than the base stations in the established synchronization and the neighboring base stations, of all the base stations that can be identified in accordance with the PN codes. The mobile communication terminal apparatus MS does not necessarily measure all the pilot signals from the remaining base stations, and may measure only a part of them as occasion requires.

When the mobile communication terminal apparatus MS has completed the above measurement, the apparatus MS determines at step 3e whether or not there is a pilot channel whose receiving strength measurement value (Ec/Io) is equal to or larger than a reference value, of the pilot channels whose receiving strengths have been measured. If the apparatus MS finds a pilot channel whose receiving strength is equal to or larger than the reference value, the operation proceeds to the hand-over request control. If the apparatus MS does not find a pilot channel whose receiving strength is equal to or larger than the reference value at step 3e, the operation proceeds to step 3f and then the apparatus MS determines whether all the ratios of receiving strength $(Ec/Io)_{PNa2}$ of the pilot channel PNa2 in the established synchronization to receiving strength $(Ec/Io)_{other}$ of each of the pilot channels from the neighboring base stations and the remaining base stations, i.e. all the valves of $(Ec/Io)_{PNa2}/(Ec/Io)_{other}$ are equal to or larger than the reference value. If all the ratios are equal to or larger than the reference value, the operation proceeds to the hand-over request control. If any one of the ratios $(Ec/Io)_{PNa2}/(Ec/Io)_{other}$ is smaller than the reference value, the hand-over request control is not executed.

Figure 4:
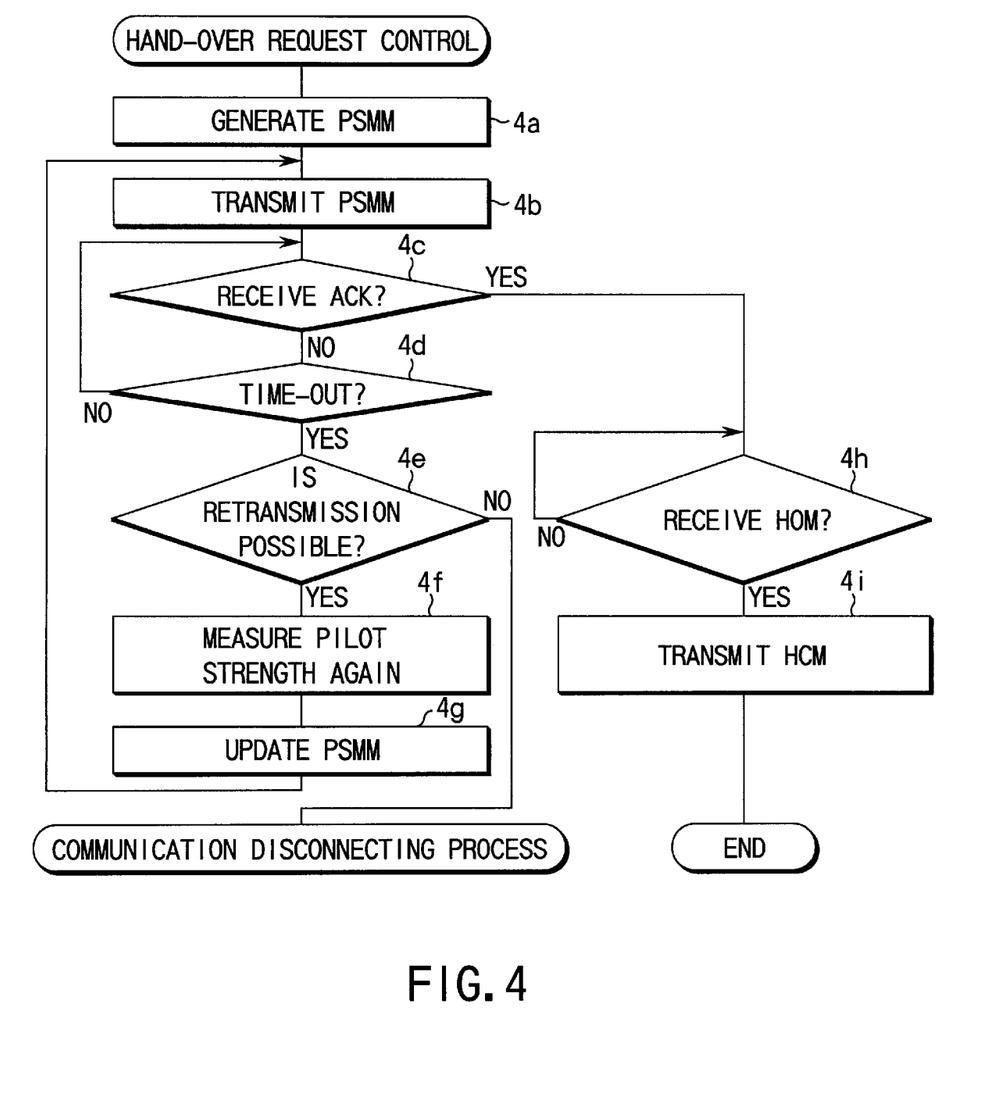
FIG. 4 is a flow chart showing hand-over request control steps that are executed at a mobile communication terminal apparatus shown in FIG. 2 and their contents.

When the operation proceeds to the hand-over request control, the mobile communication terminal apparatus MS executes this control in the following manner. FIG. 4 shows a flow chart showing the control steps and their control contents. The mobile communication terminal apparatus MS first generates a pilot strength measurement message (PSMM) as a message to request the hand-over, at step 4a. The measurement value of the receiving strength of the pilot channel PNa2 in the established synchronization, and the receiving strength measurement values of all the pilot channels from the neighboring base stations and the remaining base stations, which have been obtained under the above-described hand-over determination control, are inserted into the pilot strength measurement message. Then, the apparatus MS transmits the pilot strength measurement message to the base station BSa in the established synchronization, at step 4b.

After transmitting the pilot strength measurement message, the mobile communication terminal apparatus MS starts up a timer, and monitors the returning of an acknowledgement response (ACK) from the base station BSa at step 4c while monitoring the time-out of the timer at step 4d. If the acknowledgement response is sent back from the base station BSa before the timer times out, the operation proceeds to step 4h and then the apparatus MS waits for arrival of a hand-over direction message (HOM) from the base station BSa. When the apparatus MS receives the hand-over direction message, it sends back a hand-over completion message (HCM) at step 4i. After that, the apparatus MS executes the synchronization establishing process with the pilot channel at the hand-over destination instructed by the hand-over direction message.

Now, it is assumed that, for example, the condition of the radio transmission path with the base station BSa is degraded due to the influence from the movement of the mobile communication terminal apparatus MS or the influence of the multi-path and, for this reason, the pilot strength measurement message does not reach the base station BSa or the acknowledgement response from the base station BSa cannot be received.

Then, the mobile communication terminal apparatus MS confirms the time-out of the timer at step 4d, and the operation proceeds to step 4e where the mobile communication terminal apparatus MS determines whether the retransmission of the pilot strength measurement message is possible or not, or determines that the retransmission is possible if, for example, the transmission of the pilot strength measurement message is executed at times which are smaller than predetermined times. If the retransmission is possible, the apparatus MS measures again the receiving strength of the pilot channel PNa2 in the established synchronization and the receiving strengths of all the pilot channels from the neighboring base stations and the remaining base stations and then updates the contents of the pilot strength measurement message on the basis of the result of the measurement, at step 4f. Further, the apparatus MS transmits the updated pilot strength measurement message to the base station BSa in the established synchronization, at step 4b.

After that, the mobile communication terminal apparatus MS monitors the returning of the acknowledgement response from the base station BSa every time it retransmits the pilot strength measurement message. If the apparatus MS cannot receive the acknowledgement response during a period until the timer times out, it repeats the retransmission control of the pilot strength measurement message at steps 4b to 4g as described above. Repeating the retransmission control is completed when it is executed at preset times.

As described above, in the present embodiment, the necessity of the hand-over is determined, under the hand-over determination control, on the basis of the receiving strength measurement value of the pilot channel PNa2 in the established synchronization and the receiving strength measurement values of all the pilot channels from the neighboring base stations and the remaining base stations. If it is determined that the hand-over is required, the pilot strength measurement message is generated and transmitted to the base station BSa under the hand-over request control. Then, the arrival of the acknowledgement response from the base station is monitored. If the acknowledgement response is not sent back before the timer times out, the receiving strength of the pilot channel PNa2 in the established synchronization and the receiving strengths of all the pilot channels from the neighboring base stations and the remaining base stations are measured again, and the pilot strength measurement message including the current measurement values that are obtained from the re-measurement is transmitted to the base station BSa.

Therefore, according to the present embodiment, when the pilot strength measurement message is retransmitted, the receiving quality measurement values of respective pilot channel, which are inserted into the pilot strength measurement message, are always updated to latest values. For this reason, the destination of the hand-over can be always determined at the base station BSa on the basis of the latest measurement values, and thereby the optimum hand-over can be always accomplished.

In addition, according to the present embodiment, the receiving strength of the pilot channel PNa2 in the established synchronization and the receiving strengths of all the pilot channels from the neighboring base stations and the remaining base stations are measured again after it is confirmed that the acknowledgement response from the base station BSa is not sent back, i.e. after the timer times out. For this reason, every time the re-transmission of the pilot strength measurement message is executed, the latest measurement values can be noticed to the base station BSa.

Figure 5:
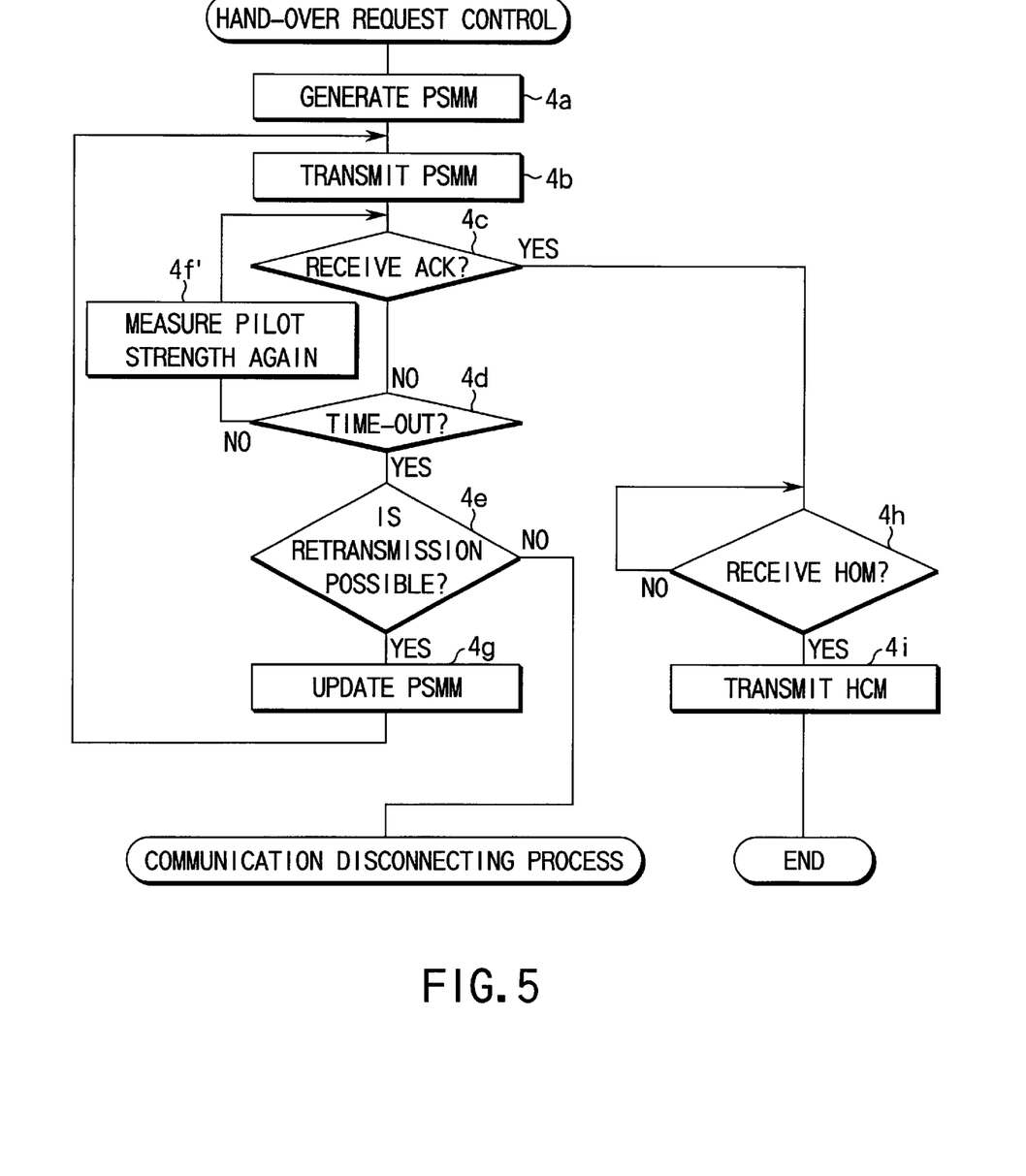
FIG. 5 is a flow chart showing hand-over request control steps that are executed at a mobile communication terminal apparatus shown in FIG. 2 and their contents, according to another embodiment.

FIG. 5 is a flow chart showing the hand-over request control steps and their control contents according to another embodiment. In the present embodiment, the receiving strengths of the pilot channels from the base station in the established synchronization and also from the neighboring and remaining base stations are measured again simultaneously with monitoring of the returning of the acknowledgement response from the base station. When the acknowledgement response does not arrive within a predetermined time, the receiving quality measurement values to be included in the pilot strength measurement message are updated on the basis of the result of the re-measurement.

In the embodiment shown in FIG. 4, after it is determined at step 4e that the pilot strength measurement massage can be retransmitted, the pilot strength is measured again at step 4f. On the other hand, in the embodiment shown in FIG. 5, after it is determined at step 4d that the timer does not time out, the pilot strength is measured again at step 4f'.

With this operation, the re-measurement of the receiving quality is executed simultaneously with the monitoring of the returning of the acknowledgement response from the base station. For this reason, when the pilot strength measurement message needs to be retransmitted, the mobile communication terminal apparatus MS can immediately transmit the pilot strength measurement message by inserting the receiving strength measurement values obtained during the period of monitoring the returning of the acknowledgement response into the pilot strength measurement message. Therefore, the time required for retransmission of the pilot strength measurement message can be reduced, and thereby the hand-over can be smoothly executed.

The present invention is not limited to the above-described embodiments. In the embodiments shown in FIGS. 4 and 5, for example, when all the values of $(Ec/Io)_{PNa2}/(Ec/Io)_{other}$ are equal to or larger than the reference value, the operation proceeds to the hand-over request control. However, if the number of $(Ec/Io)_{PNa2}/(Ec/Io)_{other}$ which are equal to or larger than the reference value is more than given number, the operation may proceed to the hand-over request control.

In addition, the communication link connection control and the communication control executed at the outgoing calls and incoming calls, and the hand-over control functions can be implemented by an integrated circuit such as a gate array or the like in place of the micro-processor.

In the above-described embodiments, the CDMA mobile communication system is exemplified. However, they can be equally applied to a system adopting the TDMA scheme of a PDC or a PHS if the mobile communication terminal apparatus has a function of transmitting the hand-over request in the system.

The present invention can be variously modified in the gist of the invention, as for the kind and the circuit configuration of the mobile communication terminal apparatus, the steps and the contents of the hand-over determination control, the steps and the contents of the hand-over request control, and the like.

As described above in detail, in the present invention, the receiving qualities of the radio signals transmitted by the base station in the established synchronization and the neighboring base stations are measured, and the necessity of the hand-over is determined on the basis of the result of the measurement. If it is determined that the hand-over is required, the request message including the receiving quality measurement values is generated and transmitted to the base station. Then, the acknowledgement response from the base station in response to the transmission of the request message is monitored. If the acknowledgement response does not arrive within a predetermined time, the transmission of the request message is repeated at, at least, one time and the receiving quality measurement values to be included in this message are updated to the latest values at the time of the retransmission of the request message.

Therefore, the present invention can provide a mobile communication terminal apparatus capable of executing the hand-over to the optimum base station at any time even when the hand-over request is noticed by the repeated transmission of the message, and thereby stably keeping the communication.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile communication terminal apparatus measuring receiving qualities of radio signals transmitted by a synchronized base station and at least one other base station, and transmitting a request message for hand-over procedure to the synchronized base station, said apparatus comprising:
 a message transmission unit configured to transmit a request message for handover based on the measured receiving qualities, the request message including the measured receiving qualities;
 a message retransmission unit configured to detect an acknowledgement response to the transmitted request message and retransmit the request message until detecting the acknowledgement response within a predetermined time; and
 a receiving quality update unit configured to update the measured qualities included in a request message to be transmitted to latest values at the time the message retransmission unit retransmits the request message.

2. A mobile communication terminal apparatus measuring receiving qualities of radio signals transmitted by a synchronized base station and at least one other base station, and transmitting a request message for hand-over procedure to the synchronized base station, said apparatus comprising:
 a message transmission unit configured to transmit a request message for handover based on the measured receiving qualities, the request message including the measured receiving qualities;
 a message retransmission unit configured to detect an acknowledgement response to the transmitted request message and retransmit the request message until detecting the acknowledgement response within a predetermined time; and
 a receiving quality update unit configured to re-measure the receiving qualities of the radio signals transmitted by said synchronized base station and said at least one of other base stations, after it is detected that there is no response of acknowledgement from said base station, and update the measured qualities included in a request message to be transmitted to latest values on a basis of a result of the re-measurement.

3. A mobile communication terminal apparatus measuring receiving qualities of radio signals transmitted by a synchronized base station and at least one other base station, and transmitting a request message for hand-over procedure to the synchronized base station, said apparatus comprising:
 a message transmission unit configured to transmit a request message for handover based on the measured receiving qualities, the request message including the measured receiving qualities;
 a message retransmission unit configured to detect an acknowledgement response to the transmitted request message and retransmit the request message until detecting the acknowledgement response within a predetermined time; and
 a receiving quality update unit configured to re-measure the receiving qualities of the radio signals transmitted by said synchronized base station and said at least one of other base stations, simultaneously with an operation of monitoring the acknowledgement response from said base station, and update the measured qualities included in a request message to be transmitted to latest values on a basis of a result of the re-measurement.

4. A CDMA mobile communication terminal apparatus receiving signals transmitted by a synchronized base station and at least one other base station, demodulating the received signals, detecting degradation of receiving qualities of the demodulated signals and transmitting a request message for hand-over procedure to the synchronized base station, said apparatus comprising:
 a message transmission unit configured to transmit a request message for handover based on the measured receiving qualities, the request message including the measured receiving qualities;
 a message retransmission unit configured to detect an acknowledgement response to the transmitted request message and retransmit the request message until detecting the acknowledgement response within a predetermined time; and
 a receiving quality update unit configured to update the measured qualities included in a request message to be transmitted to latest values at the time the message retransmission unit retransmits the request message.

5. A CDMA mobile communication terminal apparatus receiving signals transmitted by a synchronized base station and at least one other base station, demodulating the received signals, detecting degradation of receiving qualities of the demodulated signals and transmitting a request message for hand-over procedure to the synchronized base station, said apparatus comprising:
 a message transmission unit configured to transmit a request message for handover based on the measured receiving qualities, the request message including the measured receiving qualities;
 a message retransmission unit configured to detect an acknowledgement response to the transmitted request message and retransmit the request message until detecting the acknowledgement response within a predetermined time; and
 a receiving quality update unit configured to re-measure the receiving qualities of the radio signals transmitted by said synchronized base station and said at least one of other base stations, after it is detected that there is no response of acknowledgement from said base station, and update the measured qualities included in a request message to be transmitted to latest values on a basis of a result of the re-measurement.

6. A CDMA mobile communication terminal apparatus receiving signals transmitted by a synchronized base station and at least one other base station, demodulating the received signals, detecting degradation of receiving qualities of the demodulated signals and transmitting a request message for hand-over procedure to the synchronized base station, said apparatus comprising:
 a message transmission unit configured to transmit a request message for handover based on the measured receiving qualities, the request message including the measured receiving qualities;
 a message retransmission unit configured to detect an acknowledgement response to the transmitted request message and retransmit the request message until detecting the acknowledgement response within a predetermined time; and a receiving quality update unit configured to re-measure the receiving qualities of the radio signals transmitted by said synchronized base station and said at least one of other base stations, simultaneously with an operation of monitoring the acknowledgement response from said base station, and update the measured qualities included in a request message to be transmitted to latest values on a basis of a result of the re-measurement.

7. A control device used in a mobile communication terminal apparatus measuring receiving qualities of radio signals transmitted by a synchronized base station and at least one other base station, and transmitting a request message for hand-over procedure to the synchronized base station, said apparatus comprising:

an instruction unit configured to transmit a request message for handover based on the measured receiving qualities, the request message including the measured receiving qualities;

a re-instruction unit configured to detect an acknowledgement response to the transmitted request message and retransmit the request message until detecting the acknowledgement response within a predetermined time; and a receiving quality update unit configured to update the measured qualities in a request message to be transmitted to latest values at the time the re-instruction unit retransmits the request message.

8. A control device used in a mobile communication terminal apparatus measuring receiving qualities of radio signals transmitted by a synchronized base station and at least one other base station, and transmitting a request message for hand-over procedure to the synchronized base station, said apparatus comprising:

an instruction unit configured to transmit a request message for handover based on the measured receiving qualities, the request message including the measured receiving qualities;

a re-instruction unit configured to detect an acknowledgement response to the transmitted request message and retransmit the request message until detecting the acknowledgement response within a predetermined time; and a receiving quality update unit configured to re-measure the receiving qualities of the radio signals transmitted by said synchronized base station and said at least one of other base stations, after it is detected that there is no response of acknowledgement from said base station, and update the measured qualities included in a request message to be transmitted to latest values on a basis of a result of the re-measurement.

9. A control device used in a mobile communication terminal apparatus measuring receiving qualities of radio signals transmitted by a synchronized base station and at least one other base station, and transmitting a request message for hand-over procedure to the synchronized base station, said apparatus comprising:

an instruction unit configured to transmit a request message for handover based on the measured receiving qualities, the request message including the measured receiving qualities;

a re-instruction unit configured to detect an acknowledgement response to the transmitted request message and retransmit the request message until detecting the acknowledgement response within a predetermined time; and a receiving quality update unit configured to re-measure the receiving qualities of the radio signals transmitted by said synchronized base station and said at least one of other base stations, simultaneously with an operation of monitoring the acknowledgement response from said base station, and update the measured qualities included in a request message to be transmitted to latest values on a basis of a result of the re-measurement.

10. A hand-over controlling method used in a control device used in a mobile communication terminal apparatus measuring receiving qualities of radio signals transmitted by a synchronized base station and at least one other base station, and transmitting a request message for hand-over procedure to the synchronized base station, said method comprising the steps of:

measuring receiving qualities of radio signals transmitted by said synchronized base station and said at least one other base station and determining necessity of the hand-over on the basis of a result of the measurement;

transmitting a request message based on the measured receiving qualities, the request message including the measured receiving qualities;

monitoring to detect an acknowledgement response from the synchronized base station in response to the transmitted request message;

retransmitting the request message until detecting the acknowledgement response within a predetermined time; and updating the measured qualities included in a request message to be transmitted to latest values at the time the request message is retransmitted.

11. A hand-over controlling method used in a control device used in a mobile communication terminal apparatus measuring receiving qualities of radio signals transmitted by a synchronized base station and at least one other base station, and transmitting a request message for hand-over procedure to the synchronized base station, said method comprising the steps of:

measuring receiving qualities of radio signals transmitted by said synchronized base station and said at least one other base station and determining necessity of the hand-over on the basis of a result of the measurement;

transmitting a request message based on the measured receiving qualities, the request message including the measured receiving qualities;

monitoring to detect an acknowledgement response from the synchronized base station in response to the transmitted request message;

retransmitting the request message until detecting the acknowledgement response within a predetermined time; and re-measuring the receiving qualities of the radio signals transmitted by said synchronized base station, after it is detected that there is no response of acknowledgement from said synchronized base station, and updating the measured qualities included in a request message to be transmitted to latest values on a basis of a result of the re-measurement.

12. A hand-over controlling method used in a control device used in a mobile communication terminal apparatus measuring receiving qualities of radio signals transmitted by a synchronized base station and at least one other base station, and transmitting a request message for hand-over procedure to the synchronized base station, said method comprising the steps of:

measuring receiving qualities of radio signals transmitted by said synchronized base station and said at least one other base station and determining necessity of the hand-over on the basis of a result of the measurement;

transmitting a request message based on the measured receiving qualities, the request message including the measured receiving qualities;

monitoring to detect an acknowledgement response from the synchronized base station in response to the transmitted request message;

retransmitting the request message until detecting the acknowledgement response within a predetermined time; and re-measuring the receiving qualities of the radio signals transmitted by said synchronized base station, simultaneously with an operation of monitoring the acknowledgement response from said synchronized base station, and updating the measured qualities included in a request message to be transmitted to latest values on a basis of a result of the re-measurement.

13. A storage medium for storing a program to allow a processor to execute a hand-over controlling method used in a mobile communication terminal apparatus measuring receiving qualities of radio signals transmitted by a synchronized base station and at least one other base station, and transmitting a request message for hand-over procedure to the synchronized base station, said hand-over controlling method comprising the steps of:

measuring receiving qualities of radio signals transmitted by said synchronized base station and said at least one other base station and determining necessity of the hand-over on the basis of a result of the measurement;

transmitting a request message based on the measured receiving qualities, the request message including the measured receiving qualities;

monitoring to detect an acknowledgement response from the synchronized base station in response to the transmitted request message;

retransmitting the request message until detecting the acknowledgement response within a predetermined time; and updating the measured qualities included in a request message to be transmitted to latest values at the time the request message is retransmitted.

14. A storage medium for storing a program to allow a processor to execute a hand-over controlling method used in a mobile communication terminal apparatus measuring receiving qualities of radio signals transmitted by a synchronized base station and at least one other base station, and transmitting a request message for hand-over procedure to the synchronized base station, said hand-over controlling method comprising the steps of:

transmitting a request message based on the measured receiving qualities, the request message including the measured receiving qualities;

monitoring to detect an acknowledgement response from the synchronized base station in response to the transmitted request message;

retransmitting the request message until detecting the acknowledgement response within a predetermined time; and re-measuring the receiving qualities of the radio signals transmitted by said synchronized base station, after it is detected that there is no response of acknowledgement from said synchronized base station, and updating the measured qualities included in a request message to be transmitted to latest values on a basis of a result of the re-measurement.

15. A storage medium for storing a program to allow a processor to execute a hand-over controlling method used in a mobile communication terminal apparatus measuring receiving qualities of radio signals transmitted by a synchronized base station and at least one other base station, and transmitting a request message for hand-over procedure to the synchronized base station, said hand-over controlling method comprising the steps of:

measuring receiving qualities of radio signals transmitted by said synchronized base station and said at least one other base station and determining necessity of the hand-over on the basis of a result of the measurement;

transmitting a request message based on the measured receiving qualities, the request message including the measured receiving qualities;

monitoring to detect an acknowledgement response from the synchronized base station in response to the transmitted request message;

retransmitting the request message until detecting the acknowledgement response within a predetermined time; and re-measuring the receiving qualities of the radio signals transmitted by said synchronized base station, simultaneously with an operation of monitoring the acknowledgement response from said synchronized base station, and updating the measured qualities included in a request message to be transmitted to latest values on a basis of a result of the re-measurement.

* * * * *